Patented Oct. 28, 1930

1,780,048

UNITED STATES PATENT OFFICE

KARL THIESS AND BERNHARD DEICKE, OF HOCHST-ON-THE-MAIN, GERMANY, ASSIGNORS TO GENERAL ANILINE WORKS, INC., OF NEW YORK, N. Y., A CORPORATION OF DELAWARE

SULPHONATED WATER-SOLUBLE DYESTUFFS OF THE DIAMINO-DIPHENYL SERIES AND PROCESS OF PREPARING THE SAME

No Drawing. Application filed February 10, 1928, Serial No. 253,534, and in Germany February 18, 1927.

Our present invention relates to new water-soluble dyestuffs and process of making them.

We have found that the diaminodiphenyls of the following formula:

$$NH_2-C_6H_4-C_6H_4-NH_2$$

wherein the hydrogen atoms of the phenyl groups may be substituted or not, such as for instance benzidine, dichlorbenzidine, diphenyline (2.4'-diaminodiphenyl), can be condensed in both amino groups with a compound of the general formula:

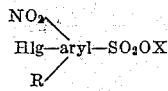

wherein Hlg stands for an exchangeable halogen atom, R for a nitro group or hydrogen and X for hydrogen or a metal, and that the yellow to brownish-red condensation products thus obtained are valuable dyestuffs. They are soluble in water and dye the animal fiber greenish-yellow to brownish-red tints.

Similar dyestuffs are obtained according to the process described in German patent specification No. 22268 by sulfurizing the corresponding nitramines. They are, however, not identical with the dyestuffs obtainable according to our present invention which have over the known dyestuffs the advantages of being more homogeneous and faster to light and of giving purer shades.

The condensation can be effected in water in an open vessel at a temperature of about 100° C. or in an autoclave at a temperature up to about 200° C. with the addition of an acid-binding agent such as sodium carbonate, sodium acetate or the like and gives a very good to quantitive yield. In some cases the reaction can be accelerated by the addition of organic solvents, as for instance alcohol, there may also be added a catalyst such as copper powder or the like as it is common practice in reactions where halogen is to be exchanged.

The following examples illustrate our invention, the parts being by weight:

(1) 18.4 parts of benzidine (=1 mol) are heated to 95° C. for about 8 hours, while stirring, in a solution of 64.1 parts (=2 mols) of potassium 1-chloro-2.6-dinitrobenzene-4-sulphonate with the addition of 12 parts of calcined sodium carbonate in 400 parts of water. The dyestuff partly separates already in the heat; on cooling, the whole solution of the reaction solidifies into a brownish-red paste. The dyestuff forms when dried a brownish-red powder. It dyes wool orange tints.

The dyestuff has the following formula:

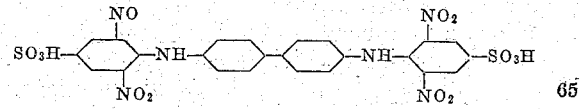

(2) 1 mol of diphenyline (2.4'-diaminodiphenyl) and 2 mols of 1-chloro-2.6-dinitrobenzene-4-sulfonic acid yield a dyestuff which dyes golden-yellow tints. It has the following formula:

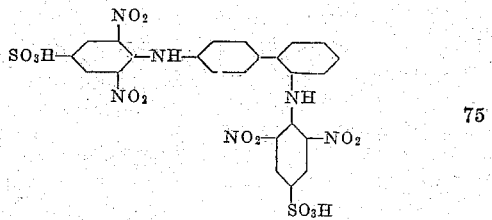

(3) 1 mol of dianisidine (4.4'-diamino-3.3'-dimethoxydiphenyl) and 2 mols of 1-chloro-2.6-dinitrobenzene-4-sulphonate yield a dyestuff which is distiinguished by its good levelling power and dyes reddish-brown tints. It has the formula:

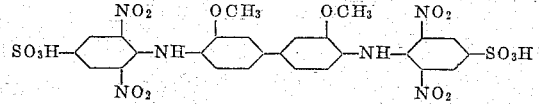

(4) 1 mol of dianisidine (4.4'-diamino-3.3'-dimethoxydiphenyl) and 2 mols of 1-chloro-2.4-dinitrobenzene-6-sulfonic acid give a dyestuff which likewise has a good levelling power and dyes reddish-brown tints. The dyestuff has the formula:

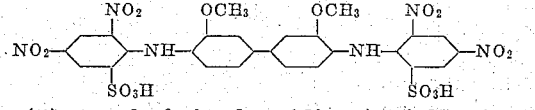

(5) 1 mol of nitrobenzidine (4.4'-diamino- 2-nitrodiphenyl) and 2 mols of 1-chloro-2.6-dinitrobenzene-4-sulfonic acid yield a dyestuff dyeing orange tints. It has the formula:

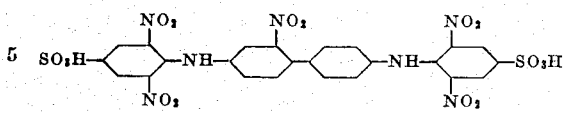

(6) By condensing 1 mol of benzidine in the usual manner with 2 mols of 1-chloro-2-nitrobenzene-4-sulfonic acid, a dyestuff is obtained which dyes wool a yellowish-brown tint. It has the formula:

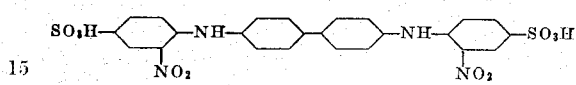

(7) By substituting for the benzidine used in Example 6 1 mol of dianisidine (4.4'-diamino-3.3'-dimethoxydiphenyl), a dyestuff is obtained dyeing reddish-brown tints. It has the following structural formula:

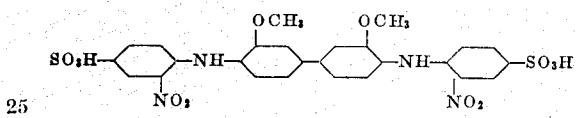

(8) From 1 mol of nitrobenzidine (4.4'-diamino-2-nitrodiphenyl) and 2 mols of 1-chloro-2-nitrobenzene-4-sulfonic acid a dyestuff is obtained which dyes a brownish-yellow tint and is particularly distinguished by its excellent levelling power. The dyestuff has the following structural formula:

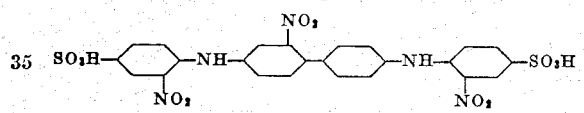

(9) 184 parts of benzidine, 560 parts of potassium 1-chloro-2-nitrobenzene-4-sulphonate, 120 parts of calcined sodium carbonate and 4000 parts of water are heated in an auotoclave provided with a stirrer for 12 hours to 120° C. to 130° C. During this operation the pressure rises to about 6 atmospheres. On cooling the dyestuff is obtained in the form of light-red needles which when redissolved and dried form a reddish-brown powder. The dyestuff has the following structural formula:

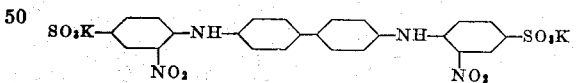

It is sparingly soluble in cold water, readily soluble in hot water to a brownish-red solution. In concentrated sulfuric acid it dissolves to a bluish-red solution which on heating turns to wine-red. The dyestuff dyes wool from an acid bath a yellowish-brown tint.

(10) In a bomb provided with a stirrer, 244 parts of orthodianisidine are heated together with 560 parts of potassium 1-chloro-2-nitrobenzene-4-sulphonate, 120 parts of calcined sodium carbonate and 4000 parts of water for 12 hours to 120° C. to 130° C. The pressure rises to about 6 atmospheres. After cooling the dyestuff is obtained in the form of brownish-red needles which in a dry state are a brown powder. The dyestuff has the following structural formula:

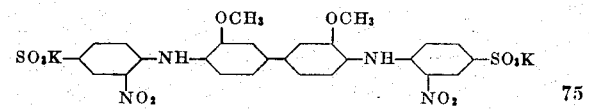

It is readily soluble in hot water, sparingly soluble in cold water to a brownish-red solution. In concentrated sulfuric acid it dissolves to an intense blue solution. On heating the color of this solution is transformed into violet. The dyestuff dyes wool from an acid bath a reddish-brown tint.

We claim:

1. The process of preparing water-soluble dyestuffs which consists in condensing a diaminodiphenyl of the following formula: $NH_2-C_6H_4-C_6H_4-NH_2$ wherein the hydrogen atoms of the phenyl groups may be substituted or not, in both amino groups with a compound of the following formula:

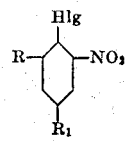

wherein Hlg represents a halogen atom; R stands for a substituent of the group consisting of hydrogen, $NO_2$, $SO_2OH$ and $SO_2O$-metal; and $R_1$ stands for a substituent of the group consisting of $NO_2$, $SO_2OH$ and $SO_2O$-metal, either R or $R_1$ being $SO_2OH$ or $SO_2O$-metal.

2. The process of preparing water-soluble dyestuffs which consists in condensing a diaminodiphenyl of the following formula: $NH_2-C_6H_4-C_6H_4-NH_2$ wherein the hydrogen atoms of the phenyl groups may be substituted or not, in both amino groups in the presence of an acid-binding agent with a compound of the following formula:

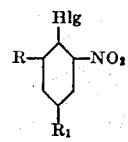

wherein Hlg represents a halogen atom; R stands for a substituent of the group consisting of hydrogen, $NO_2$, $SO_2OH$ and $SO_2O$-metal; and $R_1$ stands for a substituent of the group consisting of $NO_2$, $SO_2OH$ and $SO_2O$-metal, either R or $R_1$ being $SO_2OH$ or $SO_2O$-metal.

3. The process of preparing water-soluble dyestuffs which consists in condensing a diaminodiphenyl of the following formula: $NH_2-C_6H_4-C_6H_4-NH_2$ wherein the hydrogen atoms of the phenyl groups may be substituted or not, in both amino groups in the presence of an acid-binding agent with a compound of the following formula:

wherein Hlg stands for a halogen atom and R stands for the nitro group or hydrogen.

4. The process of preparing water-soluble dyestuffs which consists in condensing a diaminodiphenyl of the following formula: $NH_2-C_6H_4-C_6H_4-NH_2$ wherein the hydrogen atoms of the phenyl groups may be substituted or not, in both amino groups in the presence of an acid-binding agent with a compound of the following formula:

5. The process of preparing water-soluble dyestuffs which consists in condensing a diaminodiphenyl of the following formula:

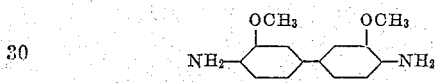

in both amino groups in the presence of an acid-binding agent with a compound of the following formula:

wherein Hlg represents a halogen atom; R stands for a substituent of the group consisting of hydrogen, $NO_2$, $SO_2OH$ and $SO_2O$-metal; and $R_1$ stands for a substituent of the group consisting of $NO_2$, $SO_2OH$ and $SO_2O$-metal, either R or $R_1$ being $SO_2OH$ or $SO_2O$-metal.

6. The process of preparing water-soluble dyestuffs which consists in condensing a diaminodiphenyl of the following formula:

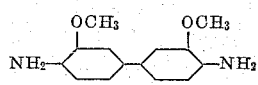

in both amino groups in the presence of an acid-binding agent with a compound of the following formula:

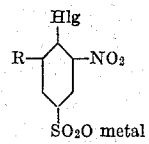

wherein Hlg stands for a halogen atom and R stands for the nitro group or hydrogen.

7. The process of preparing water-soluble dyestuffs which consists in condensing a diaminodiphenyl of the following formula:

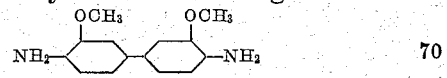

in both amino groups in the presence of an acid-binding agent with a compound of the following formula:

8. The process of preparing water-soluble dyestuffs which consists in condensing a diaminodiphenyl of the following formula:

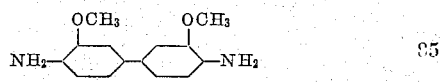

in both amino groups in the presence of an acid-binding agent and of water at a temperature between 90° C. and 200° C. with a compound of the following formula:

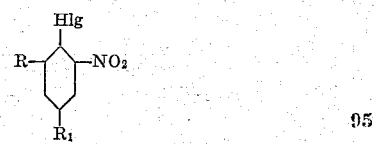

wherein Hlg represents a halogen atom; R stands for a substituent of the group consisting of hydrogen, $NO_2$, $SO_2OH$ and $SO_2O$-metal; and $R_1$ stands for a substituent of the group consisting of $NO_2$, $SO_2OH$ and $SO_2O$-metal, either R or $R_1$ being $SO_2OH$ or $SO_2O$-metal.

9. The process of preparing water-soluble dyestuffs which consists in condensing a diaminodiphenyl of the following formula:

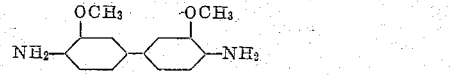

in both amino groups in the presence of an acid-binding agent and of water at a temperature between 90° C. and 200° C. with a compound of the following formula:

wherein Hlg stands for a halogen atom and R stands for the nitro group or hydrogen.

10. The process of preparing water-soluble dyestuffs which consists in condensing a diaminodiphenyl of the following formula:

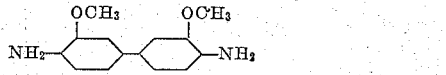

in both amino groups in the presence of an acid-binding agent and of water at a temperature between 90° C. and 200° C. with a compound of the following formula:

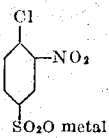

11. The process of preparing a water-soluble dyestuff which consists in heating 1 mol of ortho-diamisidine of the following formula:

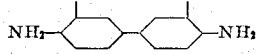

in a pressure vessel provided with a stirrer together with 2 mols of potassium 1-chloro-2-nitrobenzene-4- sulphonate of the following formula:

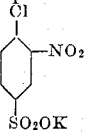

in the presence of water and sodium carbonate for 12 hours to 120° C. to 130° C.

12. As new products, the compounds of the following formula:

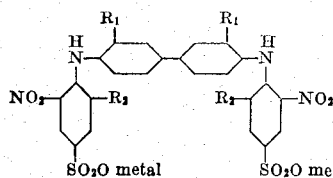

wherein $R_1$ stands for hydrogen or $OCH_3$ and $R_2$ for hydrogen or $NO_2$, the said products being yellow to brownish-red powders, soluble in water and dyeing the animal fiber greenish-yellow to brownish-red tints.

13. As a new product, the compound of the following formula:

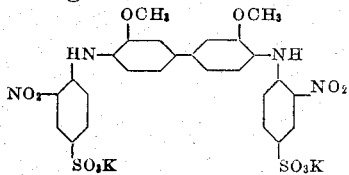

being a brown powder, difficultly soluble in cold water, soluble in hot water, with a reddish-brown coloration, dissolving in concentrated sulfuric acid to an intense blue solution and dyeing wool from an acid bath a reddish-brown tint.

14. As new products the compounds of the general formula:

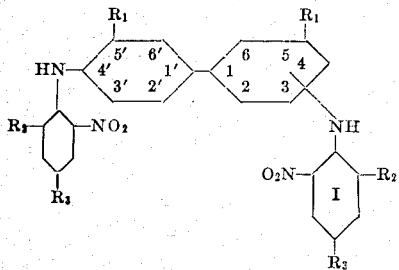

wherein $R_1$ represents hydrogen or alkoxy; $R_2$ stands for a substituent of the group consisting of hydrogen, $NO_2$, $SO_2OH$ and $SO_2O$-metal; $R_3$ stands for a substituent of the group consisting of $NO_2$, $SO_2OH$ and $SO_2O$-metal, either $R_2$ or $R_3$ being $SO_2OH$ or $SO_2O$-metal and the substituted aminophenyl residue, marked I, is attached to the diphenyl residue in the 2- or 4-position, the said products being yellow to brownish-red powders, soluble in water and dyeing animal fiber greenish-yellow to brownish-red tints.

In testimony whereof, we affix our signatures.

KARL THIESS.
BERNHARD DEICKE.

Certificate of Correction

Patent No. 1,780,048. Granted October 28, 1930, to

KARL THIESS ET AL.

It is hereby certified that error appears in the printed specification of the above numbered patent requiring correction as follows: Page 1, lines 62 to 65, in the formula for NO read $NO_2$; page 3, lines 4 to 9, in the formula insert R; and that the said Letters Patent should be read with these corrections therein that the same may conform to the record of the case in the Patent Office.

Signed and sealed this 23d day of December, A. D. 1930.

[SEAL.]

M. J. MOORE,
*Acting Commissioner of Patents.*